(12) United States Patent
Eastwood et al.

(10) Patent No.: US 7,320,445 B2
(45) Date of Patent: Jan. 22, 2008

(54) ELECTRICIAN'S CADDY

(75) Inventors: Kenneth Brian Eastwood, Fort Collins, CO (US); Sondra Kay Eastwood, Fort Collins, CO (US)

(73) Assignee: E5 Products, Inc., Las Vegas, NV (US)

( * ) Notice: Subject to any disclaimer, the term of this patent is extended or adjusted under 35 U.S.C. 154(b) by 40 days.

(21) Appl. No.: 11/107,482

(22) Filed: Apr. 15, 2005

(65) Prior Publication Data

US 2006/0231672 A1   Oct. 19, 2006

(51) Int. Cl.
  *B65H 49/26* (2006.01)
(52) U.S. Cl. .............................. 242/598.4; 242/594.4; 242/598.6; 242/588.6
(58) Field of Classification Search ............. 242/598.4, 242/599.3, 587, 580, 171, 594.4, 594.3, 598.3, 242/172, 598, 598.5, 598.6, 588, 588.3, 588.6, 242/423.2; 206/391, 394, 408, 409, 225, 206/372, 373, 575, 576, 579, 702; 220/505, 220/529, 521, 522, 835, 324, 326
See application file for complete search history.

(56) References Cited

U.S. PATENT DOCUMENTS

| | | | |
|---|---|---|---|
| 2,588,540 A * | 3/1952 | Koistinen ..................... 225/38 |
| 4,585,130 A | 4/1986 | Brennan | |
| 4,708,244 A * | 11/1987 | Fish et al. ............. 206/315.11 |
| 4,756,697 A * | 7/1988 | Hefling ........................ 439/568 |
| 4,796,830 A * | 1/1989 | Gelfman ................... 242/574.4 |
| 5,100,074 A | 3/1992 | Jones | |
| 5,139,210 A | 8/1992 | Schaffer | |
| 5,209,423 A * | 5/1993 | Barginear ................ 242/129.8 |
| 5,634,604 A | 6/1997 | Cooper | |
| 5,634,610 A | 6/1997 | Walsh | |
| 5,655,622 A | 8/1997 | Pavlu | |
| 5,687,928 A | 11/1997 | Lassiter | |
| 6,086,013 A | 7/2000 | Looney, Jr. | |
| 6,098,911 A | 8/2000 | Sheldon | |
| 6,294,759 B1 * | 9/2001 | Dunn, Jr. ..................... 219/231 |
| 6,375,115 B1 | 4/2002 | Reed | |
| 6,402,085 B1 * | 6/2002 | Smith ......................... 242/578 |
| 6,422,504 B1 | 7/2002 | Elder | |
| 6,523,776 B1 | 2/2003 | Elder | |
| 6,866,148 B2 | 3/2005 | You et al. | |
| 2002/0125161 A1 * | 9/2002 | Cote .......................... 206/408 |

* cited by examiner

*Primary Examiner*—Peter M. Cuomo
*Assistant Examiner*—William E Dondero
(74) *Attorney, Agent, or Firm*—Craig Miles; CR Miles, P.C.

(57) ABSTRACT

An electrician's caddy useful for conveyance and dispensing of wire wound on wire spools.

37 Claims, 15 Drawing Sheets

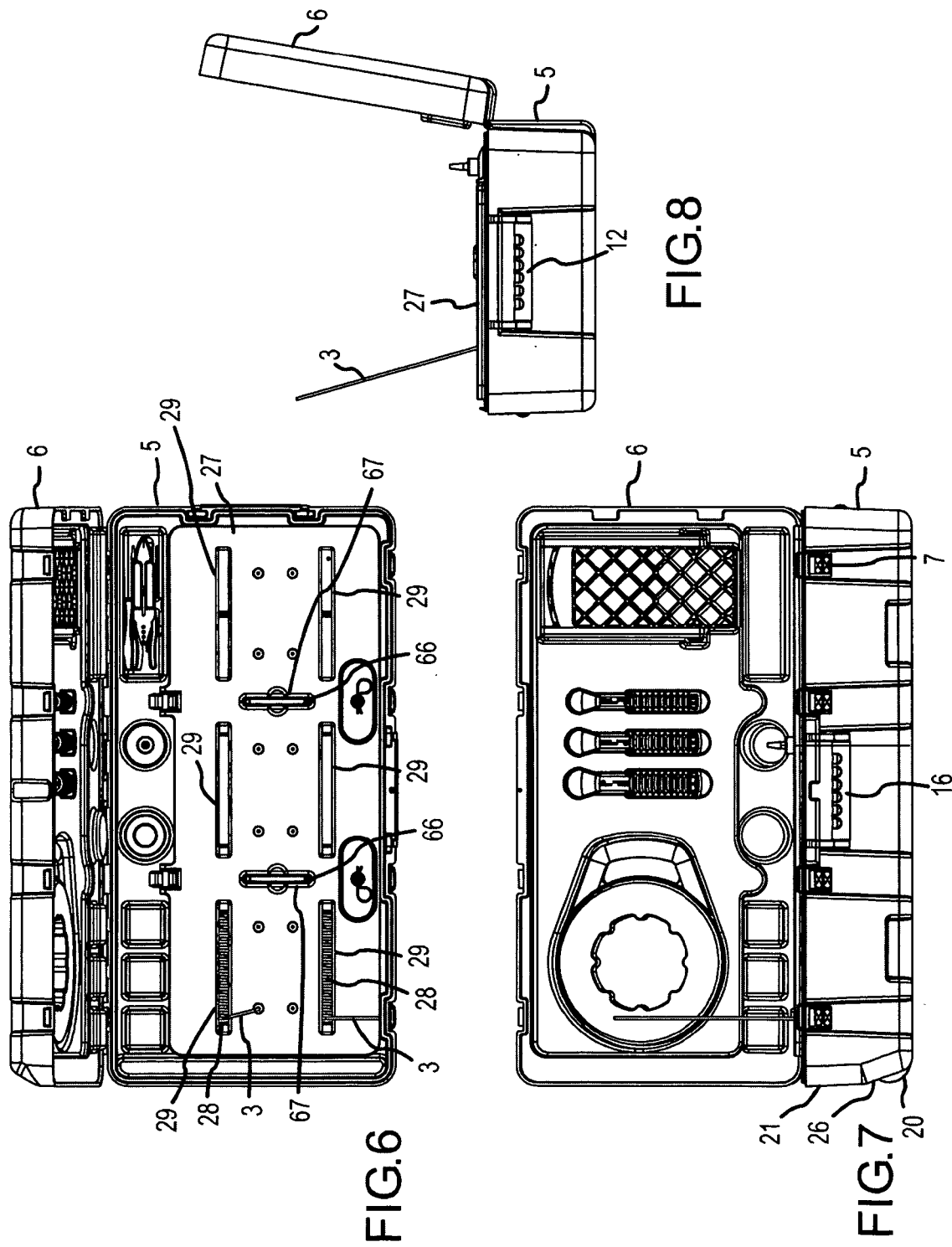

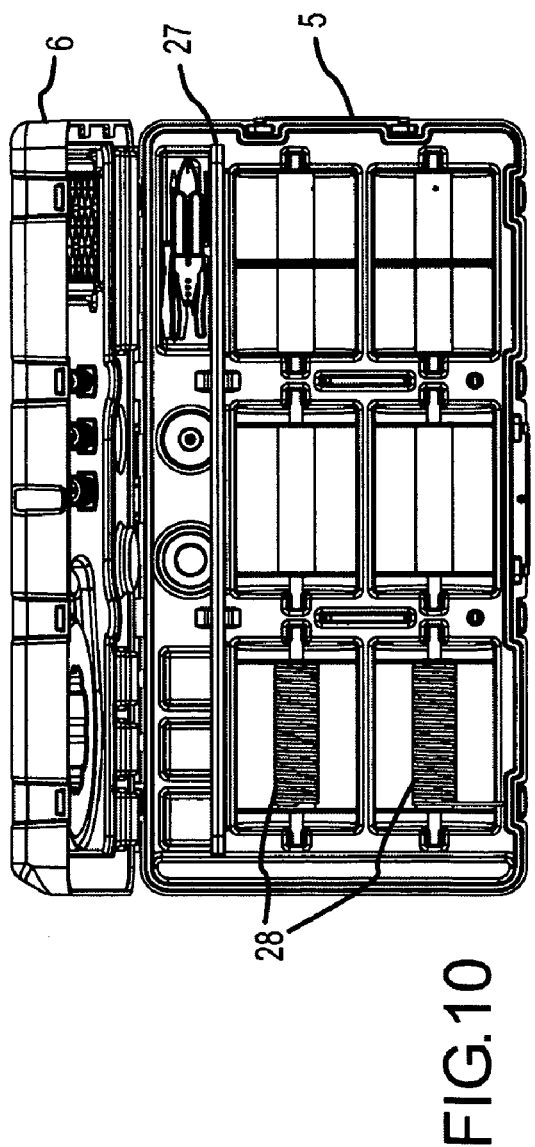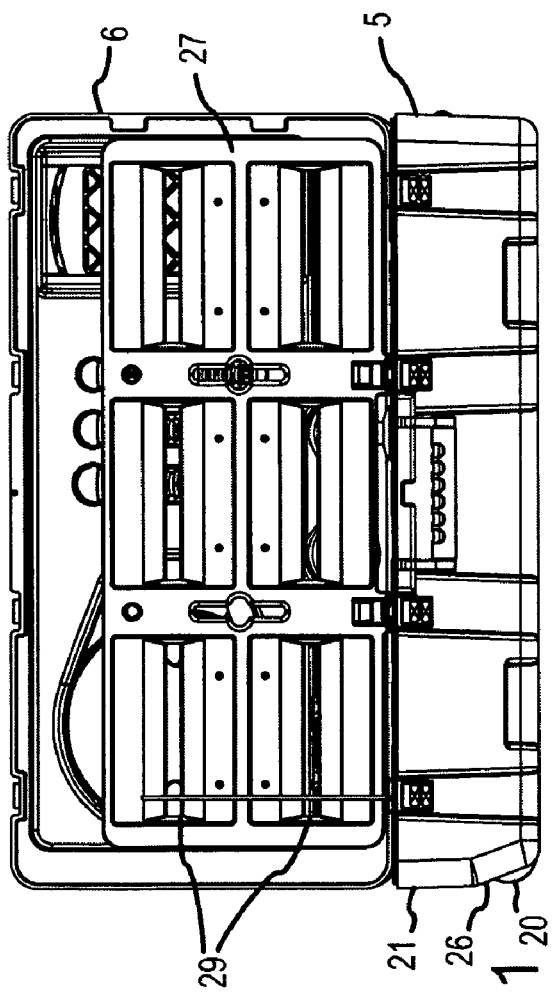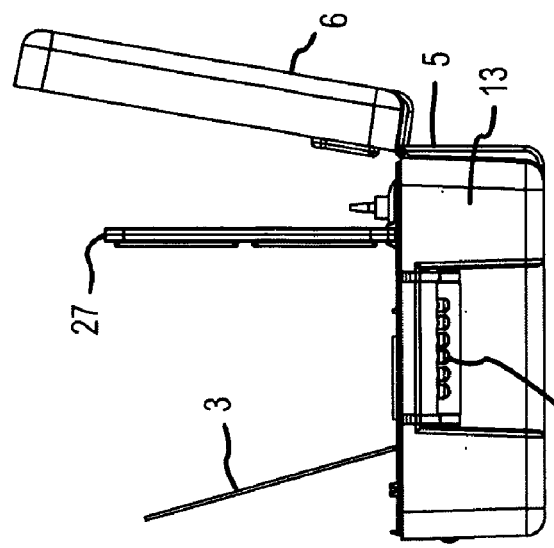

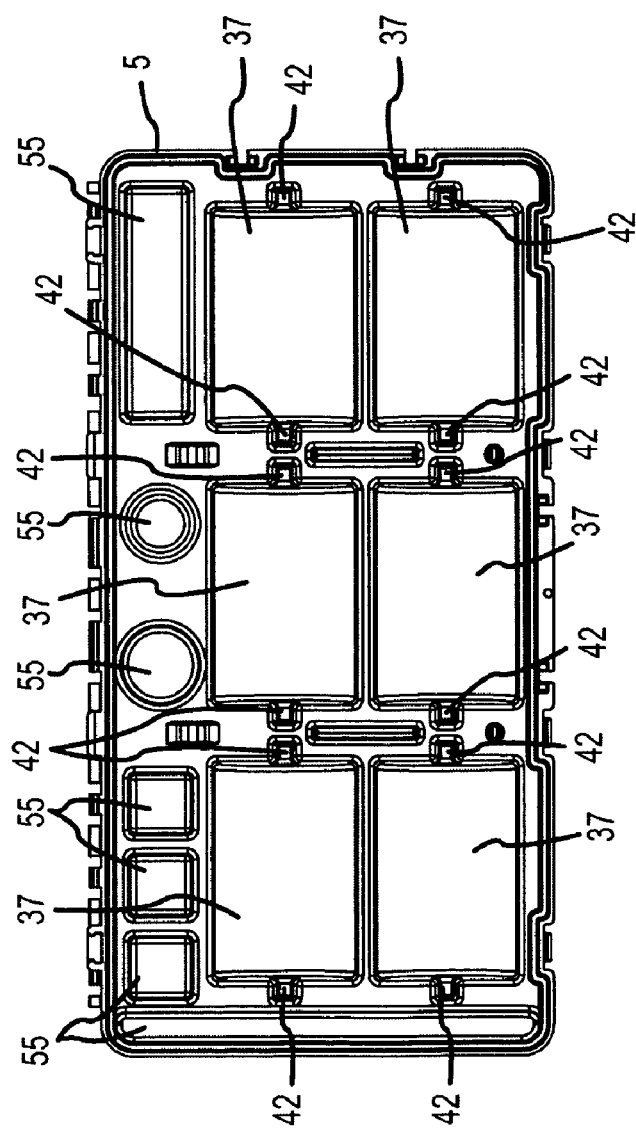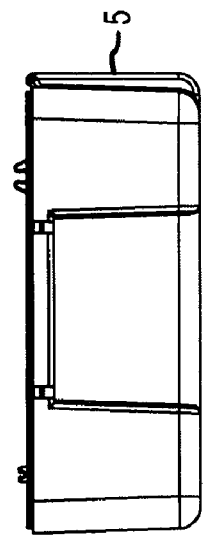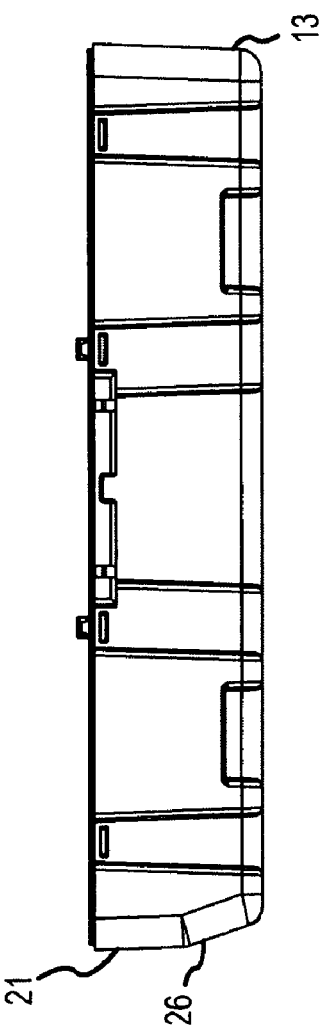

ELECTRICIAN'S CADDY

I. BACKGROUND

An electrician's caddy useful for conveyance and dispensing of wire wound on wire spools.

Electrician's must be able to draw a numerous and wide variety of wires to address the construction specifications of a given construction project. A length of each type of wire may be wound onto spools which must be transported from location to location at the construction site. Because it may be impractical to carry individual wire spools from location to location at a construction site a variety of devices have been developed to assist in the conveyance of the wire spools from location to location. Even though a there is a large commercial market for devices to assist in the conveyance of wire spools and a wide variety of devices have been developed to meet that market demand, there remain a number of significant unresolved problems with the conventional devices available to convey spools of wire from location to location at construction sites.

A significant problem with certain conventional devices which dispense wire from spools can be the lack of portability. Because a number of different spools of wire may be required at a single location and because each wire spool may be wound with several hundred feet of wire, the combined weight of the wire spools can be greater than is practical to carry from location to location. Yet many of the conventional devices which dispense wire from spools lack wheels. See for example, U.S. Pat. Nos. 6,086,013; 6,375,115; 5,655,622; 5,634,610; 5,139,210.

As to those conventional devices which further include wheels to make conveyance of a plurality of spools more convenient once located the device does not allow the wheels to disengaged from the support surface. As such, these types of conventional devices may travel of their own accord, may travel as wire is drawn from the spools, or fail to provide adequate resistance to allow wire to be properly drawn from the spools. See for example, U.S. Pat. Nos. 5,687,928; 6,523,776; 6,422,504; and 4,585,130.

Another significant problem with certain conventional devices which dispense wire from spools can be the lack of means to prevent the wire from traveling outside of the spool ends as the wire is drawn from the spool. The rate at which wire is drawn from the wire spool can vary and because the wire spool may not immediately compensate for the varied rate sufficient slack can be generated in the wire being drawn to allow the wire to travel over the spool ends. The wire may subsequently become entangled with other wires being drawn, with other wire spools, or the device dispensing the wire. See for example U.S. Pat. Nos. 6,086,013; 6,375,115; 5,634,610; 5,655,622; 4,585,130; 6,422,504; 6,523,776; and 5,687,928.

Entanglement of the wire may result in damage to the wire. For example, an electrical conductor may have a recommended minimum bending radius. The minimum bend radius is the radius of curvature that a flat or round wire, metallic cable, or optical fiber can bend without any adverse effects. A bend radius value is usually expressed as a whole number multiple of the conductor, cable, or fiber's overall diameter. As a non-limiting example, the Insulated Cable Engineers Association recommends a minimum bending radius of eight (8) times the overall diameter of single or multiple conductor cables. Therefore, if the diameter of a single conductor cable is 0.25 inch the minimum bending radius of the cable would be 2.00 inches. In this regard, once the wire travels outside the spool ends, engagement with other wires, wire spools, or the dispensing device can form a radius at the less than the minimum bending radius recommended for the wire. Similarly, once a wire becomes entangled the level of resistance to drawing the wire may increase and correspondingly amount of pulling tension may be applied. Under these circumstances, the maximum pulling tension of the wire may be inadvertently exceeded with consequent damage to the electrical conductor. Even in those circumstances in which the minimum bending radius or the maximum pulling tension is not exceeded, engagement of the wire can damage the surrounding insulation. Damage to the insulator may subsequently result in arcing of electrical conductors or interfere with the transmission properties of the cable or fiber.

A related problem with certain conventional devices which dispense wire from spools may be the lack of a guide to direct the wire as it is drawn from the wire spool. As such, the wire can be drawn outside the spool ends or drawn in contact with the spool ends which allows entanglement of the wire as described above or increased frictional engagement of the wire with the spool ends.

Another significant problem with certain conventional devices which dispense wire from spools can be the lack of means to cover the wire for protection. As to all the references above-cited each lacks any component to cover the wire on the wire spools both during periods of storage or during periods of use. As such the wire wound on the spools may be subject to contact damage.

Another significant problem with certain conventional devices which dispense wire from spools can be the lack of means to hold tools and other articles useful to the person using the device. This necessitates the inconvenience of obtaining, transporting and using separate devices to hold tools and other articles. As to U.S. Pat. No. 6,375,115 which attempts to address this concern, no means are provided to provide releasable closures for the compartments to retain the tools and other articles in the device.

Another significant problem with certain conventional devices which dispense wire from spools may be the lack of a rod or axle about which the wire spool rotates. See for example, U.S. Pat. No. 5,634,610 which allows the spool ends to engage the surface of the wire dispenser. Contact with the surfaces of the wire dispenser can generate frictional resistance to drawing the wire from the spool which may be excessive when several wires are simultaneously drawn. As to those conventional devices which have attempted to address this problem by providing a rod or axle about which the wire spool rotates, the rod or axle about which the wire spool rotates locate the axle or rod ends in a manner open to engagement by persons or articles. See for example, U.S. Pat. Nos. 6,375,115 and 6,422,504.

The electrician's caddy invention described below addresses each of these problems of conventional wire dispensing devices.

II. SUMMARY OF THE INVENTION

Accordingly, a broad object of the invention can be to provide a portable electrician's wire caddy having wheels which can be engaged with the support surface to be conveniently rolled from location to location at a construction site and disengaged from the support surface to allow the body of the electrician's wire caddy to locate on the support surface. One aspect of this broad object of the invention can be to provide wheels which operably engage and disengage from the support surface without adjusting the position of the wheels relative to the body of the electrician's wire caddy.

Another broad object of the invention can be to provide an axle on which the wire spool tube rotates and one, two, or a plurality of wells in the electrician's caddy invention configured to receive a corresponding one, two or a plurality of spools of wire on an axle in a manner which prevents the wire wound on each wire spool from traveling outside of the spool ends as wire is drawn from the wire spools.

Another broad object of the invention can be to enclose the axle ends on which the wire spool tube rotates to prevent engagement of the axle ends with persons or other articles or to allow entanglement of the wire with the axle ends as the wire is drawn from the wire spools.

Another broad object of the invention can be to provide a cover which releasably secures to each corresponding well to protect the wire wound on the wire spools received by the wells in the electrician's caddy. The releasably secured cover can further provide an aperture to guide the wire as it is drawn from the wire spool.

Another broad object of the invention can be to be to provide a bottom portion and a top portion of the electricians caddy with the bottom portion affording a plurality of pockets each of which are releasably sealed with corresponding top portion relief elements as the top portion mates to the bottom portion.

Naturally, further goals and objects of the invention are disclosed throughout other areas of the specification, drawings, photographs, and claims.

III. A BRIEF DESCRIPTION OF THE DRAWINGS

FIG. 6 is a top view of an embodiment of the electrician's caddy invention having the top portion released from securement with the bottom portion.

FIG. 7 is a front view of an embodiment of the electrician's caddy invention having the top portion released from securement with the bottom portion.

FIG. 8 is a first end view of an embodiment of the electrician's caddy invention having the top portion released from securement with the bottom portion.

FIG. 10 is a top view of an embodiment of the electrician's caddy invention having the top portion and the cover released from securement with the bottom portion.

FIG. 11 is a front view of an embodiment of the electrician's caddy invention having the top portion and the cover released from securement with the bottom portion.

FIG. 12 is a first end view of an embodiment of the electrician's caddy invention having the top portion and the cover released from securement with the bottom portion.

FIG. 15 is a top view of the bottom portion of an embodiment of the electrician's caddy invention.

FIG. 16 is a front view of the bottom portion of an embodiment of the electrician's caddy invention.

FIG. 17 is a first end view of the bottom portion of an embodiment of the electrician's caddy invention.

IV. DETAILED DESCRIPTION OF THE PREFERRED EMBODIMENTS

Figure 1:
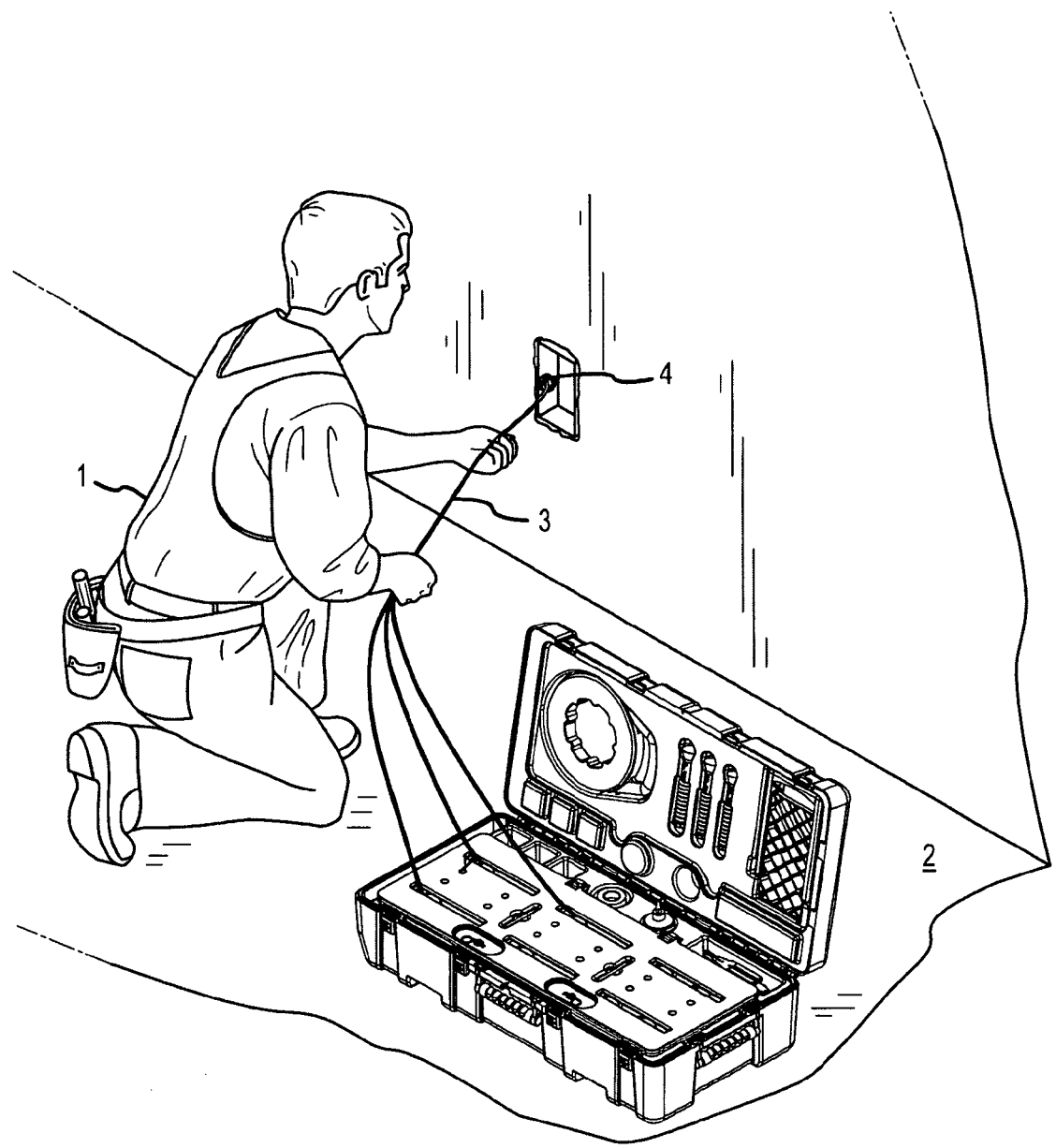
FIG. 1 shows a person using an embodiment of the electrician's caddy invention.
Figure 2:
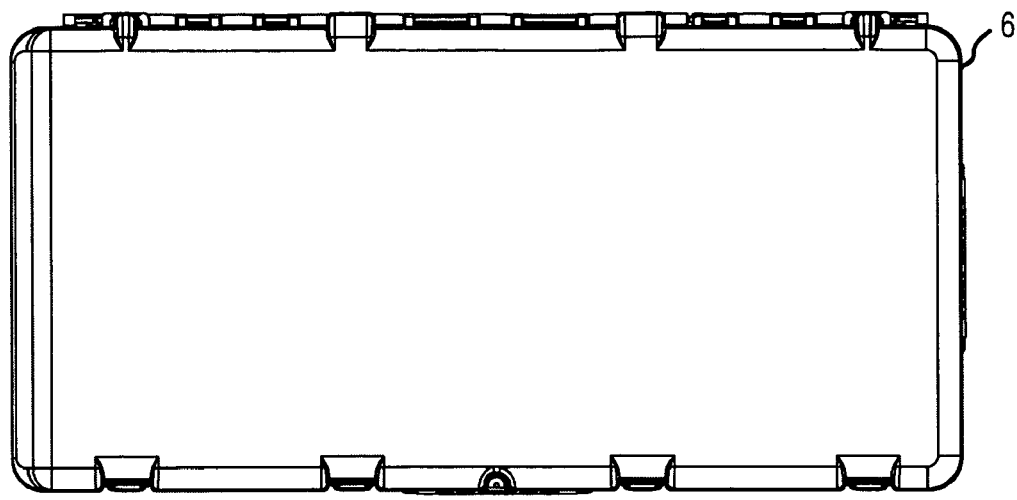
FIG. 2 is a top view of an embodiment of the electrician's caddy invention with the top portion releasably secured to the bottom portion.

Referring primarily to FIG. 1, provides an illustration of a person (1) using an embodiment of the electrician's caddy (2) invention to establish one or a plurality of wire(s) (3) inside of a conduit (4). As to certain applications, the person (1) can first feed a fish tape through the interior passage of the conduit (4) to provide a fish tape end to which one wire or the plurality of wires (3) dispensed by the electrician's caddy (2) can be attached. The fish tape can then be drawn with the wire or plurality of wires (3) through the interior passage of the conduit (4) to establish the wire or a plurality of wires (3) inside the interior passage of the conduit (4).

The term "person" as used herein generically encompasses a single person, a pair of people, or a plurality of people which individually or in combination can use the electrician's wire caddy (2) invention as described herein.

The term "wire" as used herein generically encompasses the numerous and varied types of material configured as slender rods, fibers, strands, cables, cords, or the like, comprising a single strand or a plurality of strands, whether electrically conductive or non-electrically conductive, which can be wound on a wire spool. The term "wire" as used herein specifically includes, without limitation, insulated electrically conductive wire. Insulated conductive wire can vary in diameter which may be identified by the gauge. For example, American Wire Gauges ("AWG gauges") refer to wires having a specific diameter or area in cross section. The higher the AWG gauge the smaller the diameter of wire. For example, AWG gauge 1 wire has a diameter of 0.2893 inches while AWG gauge 32 wire has a diameter of 0.008 inches. Electrically conductive wire typically comprises a copper wire or an aluminum wire which can comprise a single strand, or multiple strands of wire which may further be braided, twisted, or the like.

The term "insulation" or "insulator" as used herein generically encompasses the numerous and varied materials which are poor conductors of electricity, or are used to separate or isolate conducting materials to prevent transfer of electricity, which can be established about an electrically conductive wire. Non-limiting examples of "insulation" or an "insulator" in accordance with the invention comprise fiberglass, polyvinyl chloride, nylon, polypropylene, Dacron®, Nomex®, Kevlar®, Spectra®, silicon rubber, vinyl, acrylic, fluoropolymer, TFE, FEP, PFA, Teflon®, or the like, whether configured as a continuous layer of material (smooth or convoluted), a sleeve, spiral wrapped, braided, or the like.

The term "conduit" as used herein generically encompasses any manner of tube regardless of the exterior geometry which defines a passage in which a wire or a plurality of wires can be established. Typically, conduit has a tubular configuration in which a conduit wall of circular cross section defines an interior passage having a particular diameter. For many applications, the diameter can be between about one-half inch and about one and one-half inches; however, this range is not intended to be limiting with regard to the diameter of conduits in which electrical conductors can be established and the interior passage can be of any lesser or greater diameter. The conduit wall may vary in thickness, even though the interior passage may retain substantially the same interior passage diameter. Conversely the conduit wall may vary in thickness and the interior passage diameter may vary accordingly to retain a substantially constant external diameter of the conduit. Conduit can be obtained in a variety of materials, including without limitation, aluminum, polyvinylchloride, polyvinyl chloride exterior coated rigid metal, urethane interior coated metal, stainless steel, galvanized steel, brass, flexible metal, corrugated metal, corrugated plastic, polyethylene, nylon, nylon wire loom conduit, chrome corrugated metal, polytetrafluoroethylene, or zinc-coated metal.

The term "conduit end" as used herein generically describes the terminal end of a conduit whether the end of a continuous segment of conduit or the end of a mechanical fitting coupled to a continuous segment of conduit.

Now referring primarily to FIGS. 2-5 and 14, an embodiment of the electrician's caddy (2) invention comprises a bottom portion (5) to which a top portion (6) releasably secures. As to certain non-limiting embodiments of the invention the top portion (6) releasably secures to the bottom portion (5) with a plurality of mechanical fasteners (7). The electrician's caddy can further comprise an axis (8) about which the top portion (6) rotates to releasably secure with the bottom portion (5). The location of the axis (8) can be defined by the operation of a numerous and wide variety of jointed or hinged devices to which the top portion (6) rotatably couples to the bottom portion (5). A particular non-limiting embodiment of the invention as shown by FIGS. 2-5 and 14 provides a plurality of axles (9) about which a plurality of top portion hinge leafs (10) and a plurality of bottom portion hinge leafs (11) are rotatably coupled.

Figure 5:
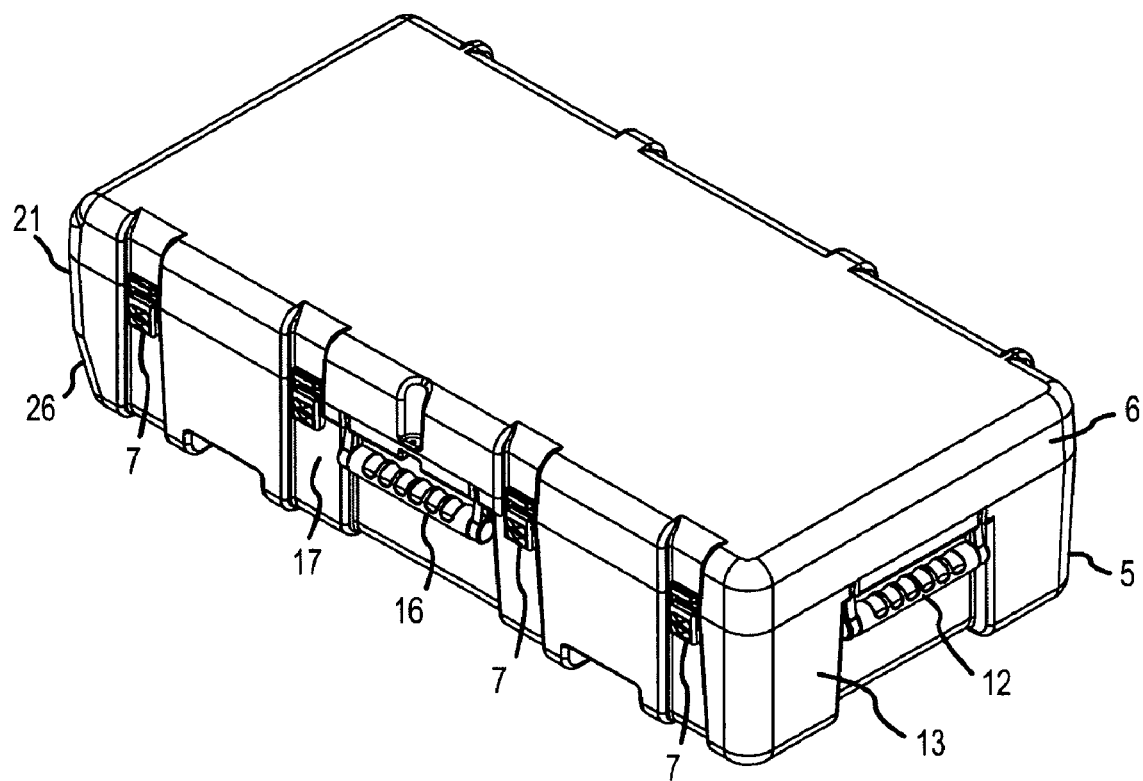
FIG. 5 is a front side first end perspective view of an embodiment of the electrician's caddy invention with the top portion releasably secured to the bottom portion.
Figure 14:
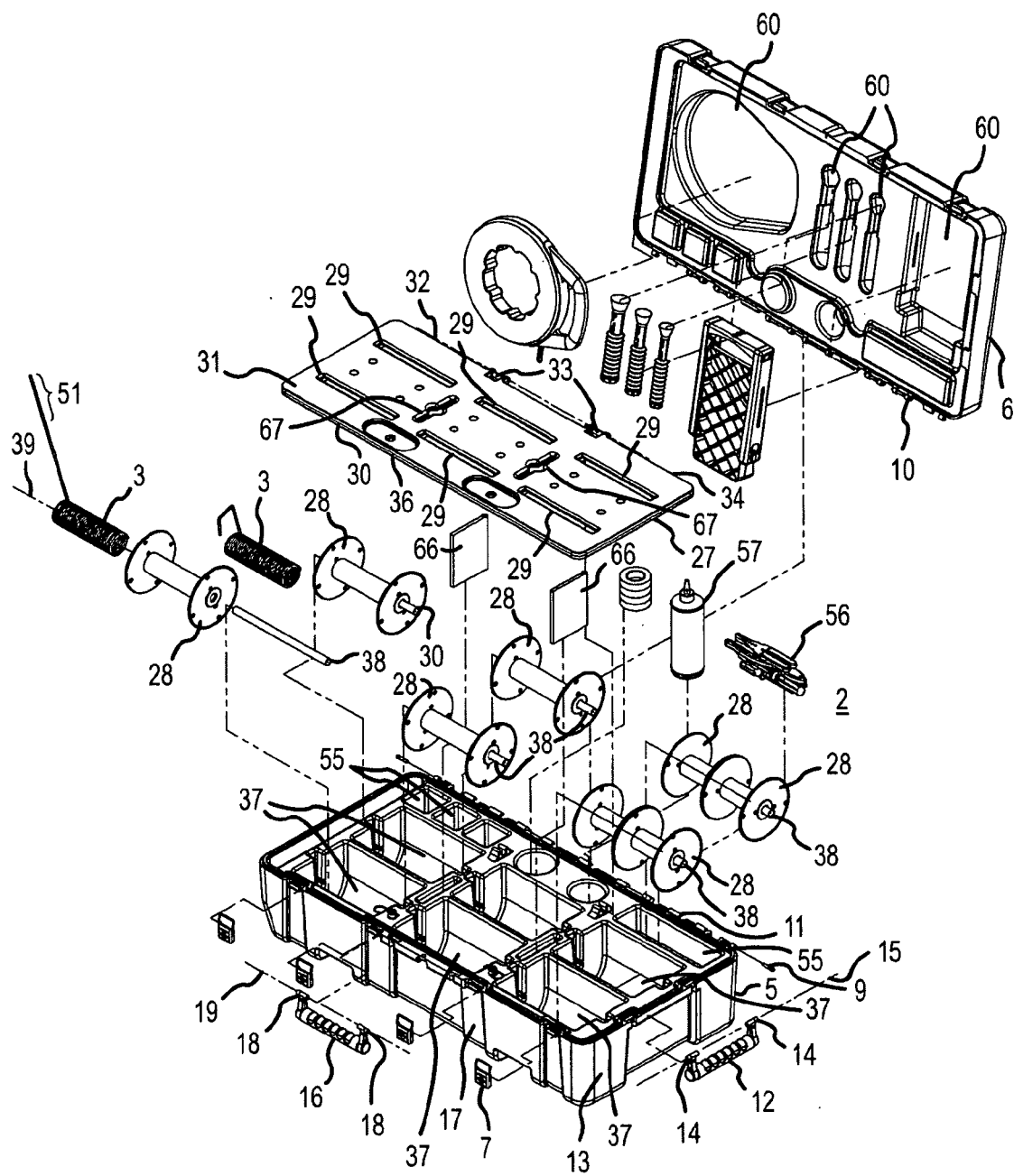
FIG. 14 is an exploded view of an embodiment of the electrician's caddy invention.

Now referring specifically to FIGS. 5 and 14, the bottom portion (5) of the electrician's caddy (2) can further include a first handle (12) connected at a first end (13) of the bottom portion (5). The first handle (12) can further comprise a first pair of handle pivot elements (14) which allows the first handle (12) to rotate about a first pivot axis (15) located at the first end (13) of the bottom portion (5). The bottom portion (5) can further include a second handle (16) connected to a first side (17) of the bottom portion (5). The second handle (16) can further include a second pair of handle pivot elements (18) which allows the second handle to rotate about a second pivot axis (19) located at the first side (17) of the bottom portion (5).

Figure 3:
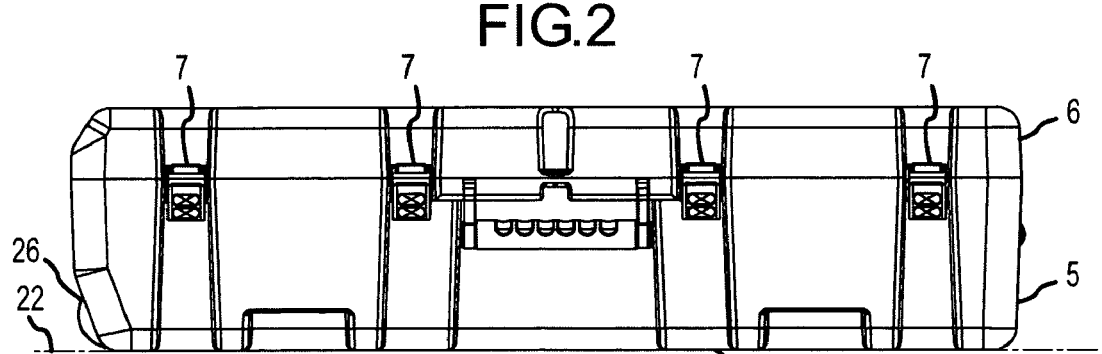
FIG. 3 is a front view of an embodiment of the electrician's caddy invention with the top portion releasably secured to the bottom portion.
Figure 4:
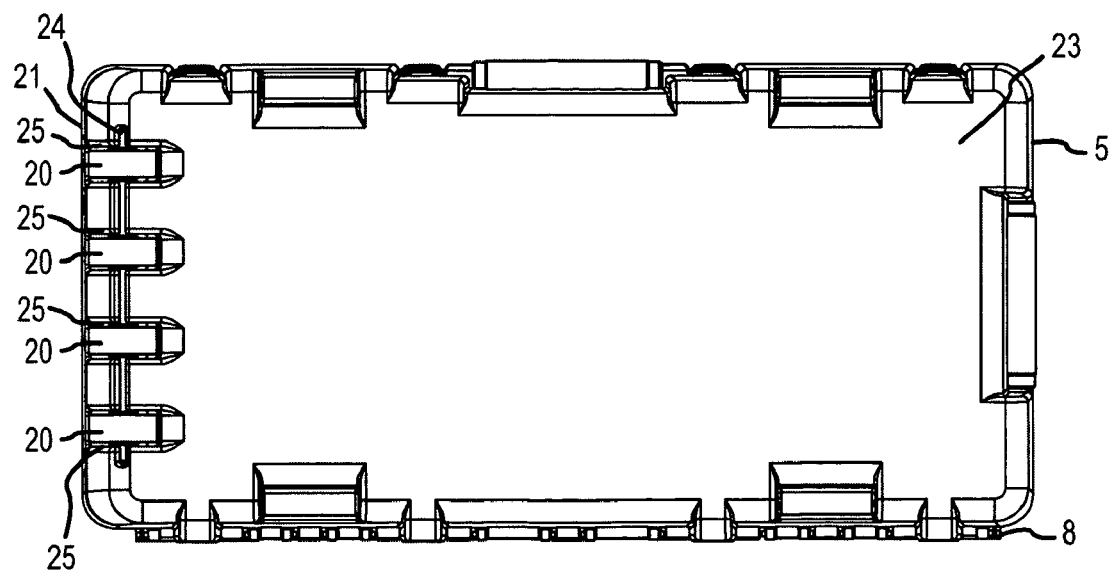
FIG. 4 is a bottom view of an embodiment of the electrician's caddy invention with the top portion releasably secured to the bottom portion.

Now referring specifically to FIG. 4, the bottom portion (5) of the invention can further comprise one, two, or a plurality of wheels (20) rotatably coupled to the bottom portion (5) of the electrician's caddy (2). As to some embodiments of the invention, the wheel(s)(20) can be rotatably coupled to the second end (21) of the bottom portion (5) at a location which allows engagement of the wheel(s)(20) with a support surface (22)(as shown by FIG. 3) when the person elevates the opposed first end (13) of the bottom portion (5), and conversely, when the person lowers the opposed first end (13) of the bottom portion the wheels disengage the support surface (22) to allow substantially the entirety of the bottom surface (23) of the bottom portion (5) to engage the support surface (22).

Now referring specifically to FIGS. 3 and 4, as to particular non-limiting embodiments of the invention, the wheels (20) rotate about the longitudinal axis of a wheel axle (24) which locates a portion of each wheel (20) within a wheel housing (25). This configuration facilitates engagement and disengagement of the wheels (20) with the support surface (22) as above-discussed while reducing the portion of each wheel (20) exposed beyond the exterior surfaces of the bottom portion (5). The configuration of the second end (21) of the bottom portion (5) can further include an angled surface (26) at which the surface of the second end surface (21) and the bottom surface (23) meet to allow a portion of each wheel (20) to be sufficiently exposed to allow engagement of each wheel with the support surface (22) as the first end (13) of the bottom portion (5) is elevated above the support surface (22).

Now referring primarily to FIGS. 6-9 and 14, a non-limiting embodiment of the electrician's caddy (2) is shown with the top portion (6) rotatably released from the bottom portion (5). As shown, the invention can further include a cover (27) which releasably secures to the bottom portion (5) to retain at least one wire spool (28) in the bottom portion (5). The cover (27) further provides at least one aperture element (29) which communicates between opposed surfaces (30)(31) (see FIG. 14) of the cover (27) to allow the wire (3) wound on the wire spool (28) to be drawn through the at least one aperture (29).

Now referring primarily to FIGS. 10-14, a non-limiting embodiment of the electrician's caddy (2) is shown with the cover (27) released from the bottom portion (5). As to the particular embodiment of the cover (27) shown, the cover (27) rotates about a cover axis (32)(see FIG. 14) defined by a pair of cover hinge elements (33) coupled to a first cover side (34) while releasable securement is affected through mechanical fasteners (35) which engage the opposing side of the cover (36). A wide variety of mechanical fasters could be utilized to secure the cover (27) to the bottom portion (5) of the electrician's caddy (2) including for example spirally threaded posts and mated spirally threaded wing nuts, spirally threaded sockets and mated spirally threaded bolts, members which rotate about a post to engage the surface of the cover (27), or the like.

Now referring specifically to FIG. 14, which provides a non-limiting exploded view of a particular embodiment of the electrician's caddy (2) invention, each of the wire spools can be received into a corresponding well (37) (see also FIGS. 15 and 18) located in the bottom portion (5) of the electrician's caddy. The cover (27) can be secured to the bottom portion (5) and the wire (3) wound on each corresponding wire spool (28) can be drawn through the corresponding aperture (29) of the cover (27).

Certain embodiments of the electrician's caddy (2) can further include a wire spool axle or a plurality of wire spool axles (38) which insert into a corresponding one wire spool or plurality of wire spools (28). Each wire spool axle (38) provides an axis (39) about which the wire spool (28) rotates as wire (3) is drawn through the corresponding aperture (29) in the cover (27).

Now referring primarily to FIG. 14 and FIGS. 15-19, the wire spool axle (38) can have a location in the corresponding well (37) which maintains a distance (39) between opposed surfaces of the wire spool ends (40) and the well surface (41). The distance between opposed surfaces of the wire spool ends (40) and the well surface (41) can be comprise a distance that is less than the diameter of the wire (3) wound on the wire spool (28). By maintaining the distance between the wire spool ends (40) and the well surface (41) at less than the diameter of the wire (3), the wire (3) wound on the wire spool (28) can be retained between the wire spool ends (40) as the wire (3) is drawn through the corresponding aperture (29) in the cover (27).

Figure 18:
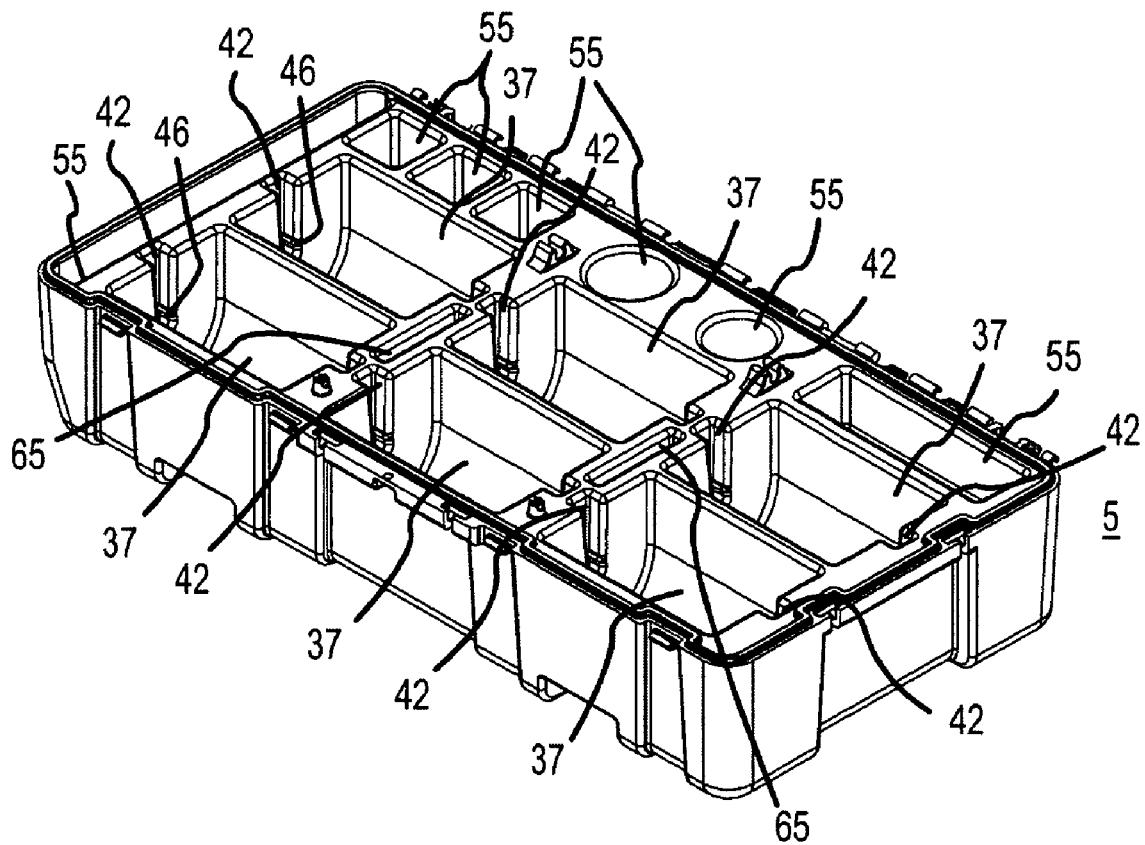
FIG. 18 is a front first end perspective view of the bottom portion of an embodiment of the electrician's caddy invention.
Figure 19:
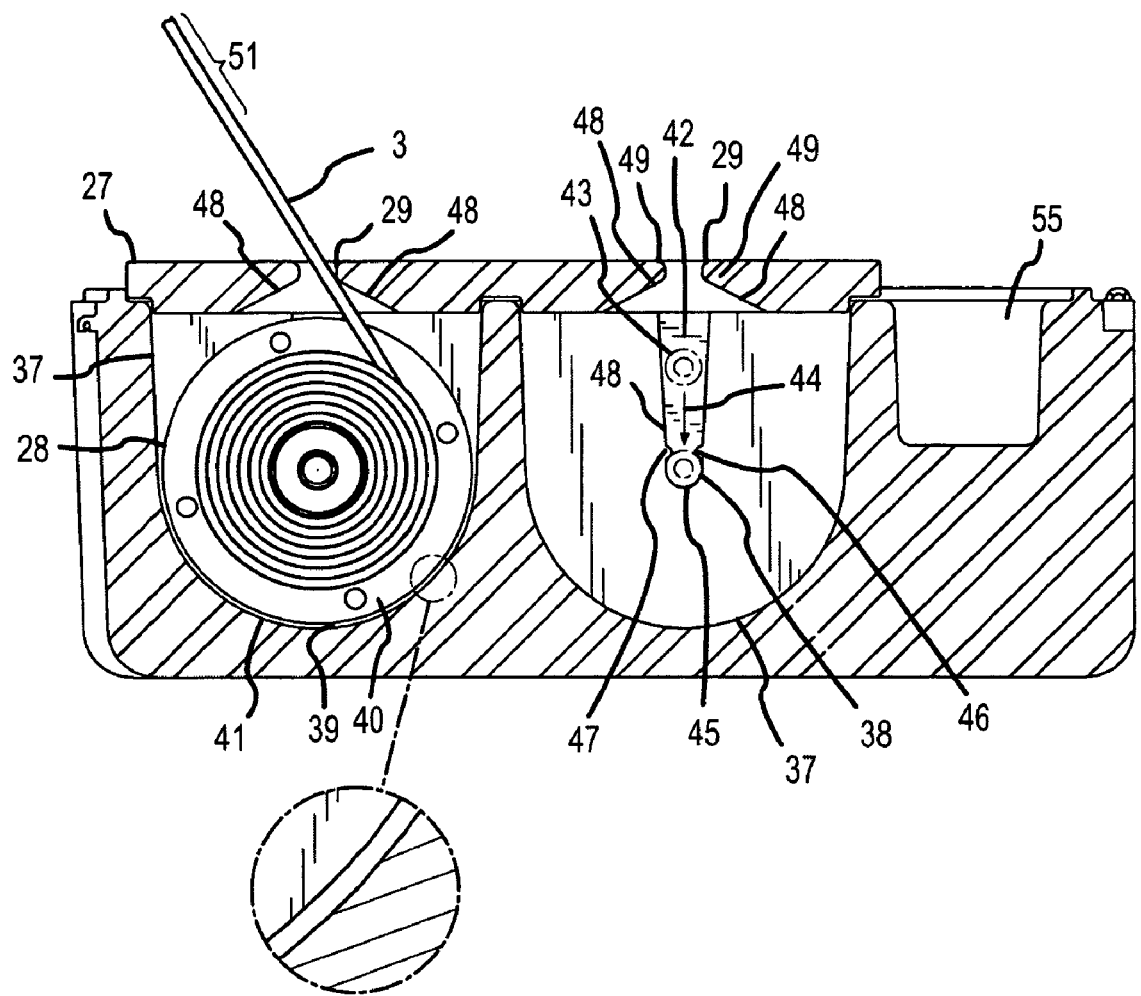
FIG. 19 shows section 9-9 of the embodiment of the electrician's caddy invention shown by FIG. 9.

Now referring primarily to FIGS. 15 and 18-19, particular embodiments of the invention can provide a pair of closed end channels (42) coupled to opposed walls of at least one well (37). A corresponding axle end (43) of the wire spool axle (38) slidly travels (44) in each of the pair of closed end channels (42) to locate the wire spool axle (38) in the well (37) of the bottom portion (5). As discussed above, the bottom surface (45) of each closed end channel (42) can locate the wire spool axle at the proper location to maintain a distance between the wire spool ends (40) and the well surface (41) to retain the wire (3) wound on the wire spool (28) between the wire spool ends (40) as the wire (3) is drawn through the aperture (29) of the cover (27) during use.

At least one detent (46) can be disposed in each closed end channel (42) which operates to limit travel of the corresponding axle end (43) in each of the closed end channels (42) as the wire (3) is drawn through the aperture (29) of the cover during use. Similarly, as to other embodiments of the invention, a pair of opposed detents (46)(47) can be disposed in each closed end channel (42). The closed end channel wall (48) responsive to the at least one detent (46) or the pair of opposed detents (46)(47) can be sufficiently flexibly resilient to allow each corresponding axle end (43) to be forcibly urged over the detent (46) or the pair opposed of detents (46)(47) which allows the well (37) to receive a wire spool (28) on which wire (3) is wound. In reverse order each axle end (43) can be pulled over the detent (46) or the pair of opposed detents (46)(47) to remove the axle (38) from the well (37) when the wire (3) wound on the wire spool (28) becomes exhausted.

Figure 21:
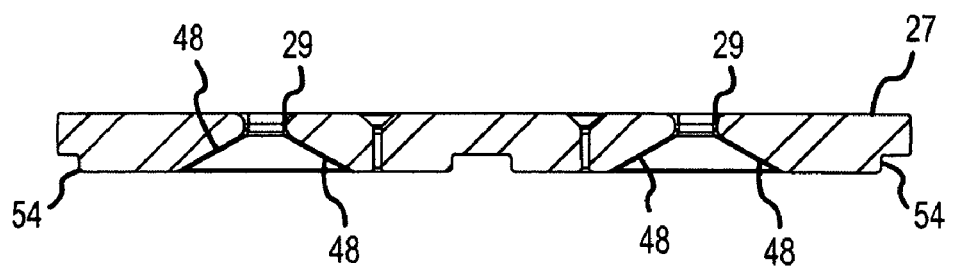
FIG. 21 shows section 24-24 of an embodiment of the electrician's caddy invention shown by FIG. 24.
Figure 22:
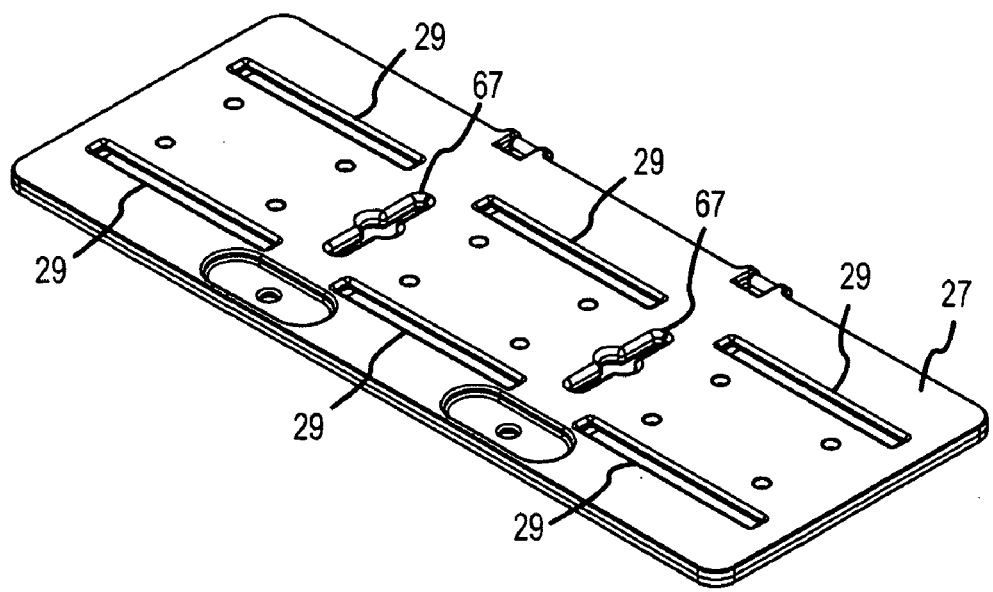
FIG. 22 is a front first end perspective view of the cover of an embodiment of the electrician's caddy invention.
Figure 24:
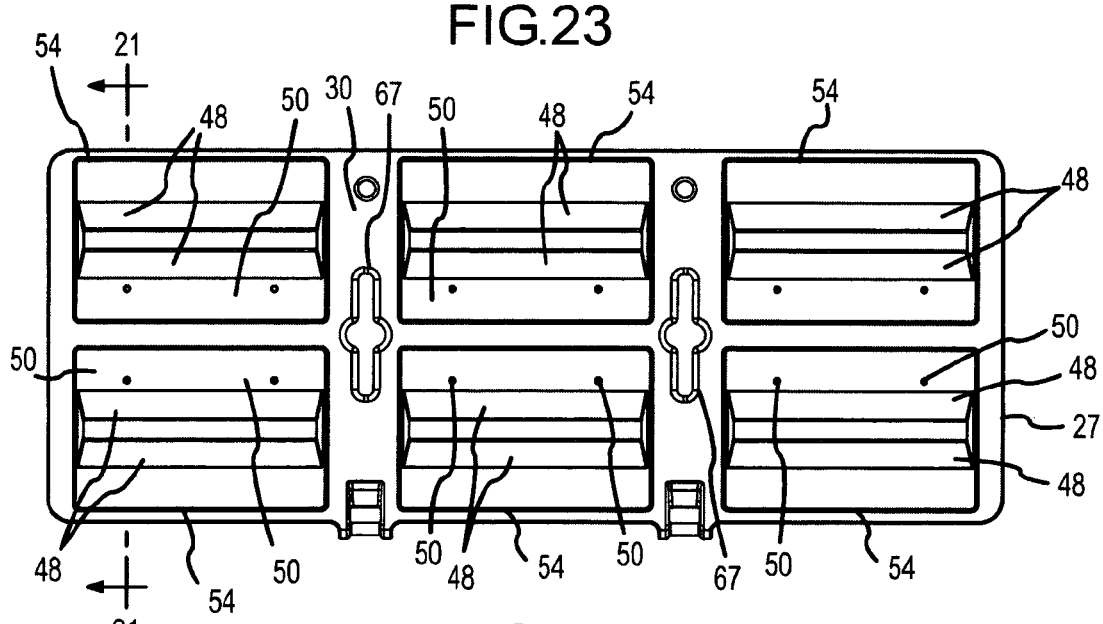
FIG. 24 is a bottom view of the cover of an embodiment of the electrician's caddy invention.

Now referring primarily to FIGS. 19, 21, and 24, embodiments of the invention can further include a chamfer element (48) coupled to each aperture (29) which communicates between opposed surfaces the cover (27). The chamfer element can have an angle of between about twenty degrees and about forty five degrees relative to the cover surface (30) which faces the interior of the well (37). As shown by FIGS. 19, 21, and 24, certain embodiments of the invention can provide a pair of chamfer elements (48) coupled to each aperture (29). The chamfer element(s)(48) assist in disseminating forces between the cover (27) and the wire (3) as the wire (3) is drawn through the aperture (29). To further disseminate forces between the cover (27) and the wire (3) drawn through the aperture (29) a radius element (49) can be coupled between the chamfer element (48) and the exterior surface (31) of the cover (27). Specifically referring to the configuration of the aperture (29), the aperture (29) can be configured as a slot as shown in the various figures; however, the drawings are not meant to be limiting with regard to the numerous and varied configurations in which the aperture (29) can be configured and the aperture can define various geometries such as a circle, an oval, a square, a rectangle, or otherwise depending upon the kind or type of wire (3) to be drawn through the aperture (29).

Figure 23:
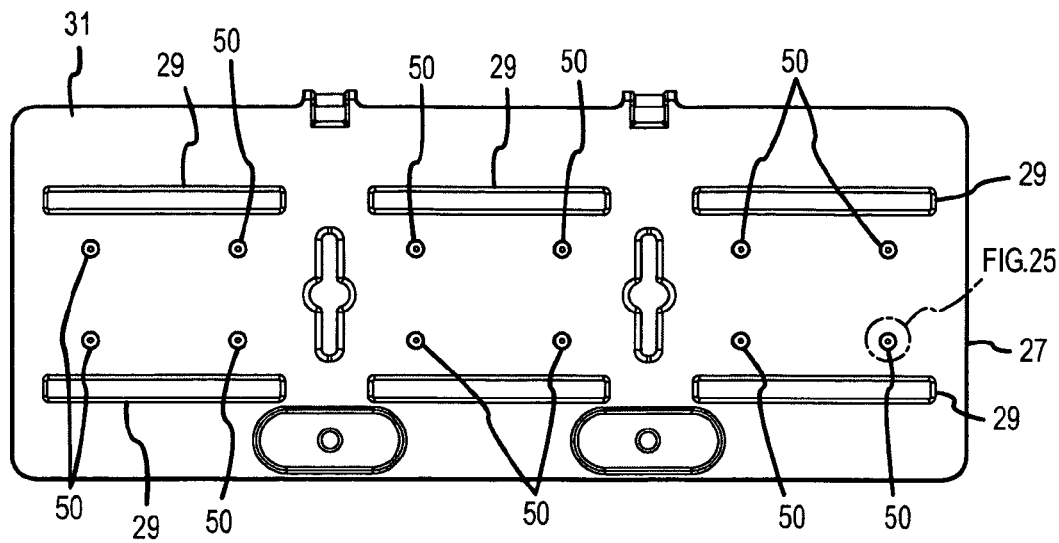
FIG. 23 is a top view of the cover of an embodiment of the electrician's caddy invention.
Figure 25:
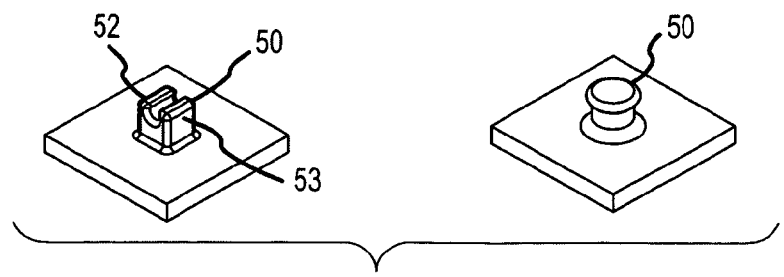
FIG. 25 shows alternate embodiments of a wire retainer.
Figure 29:
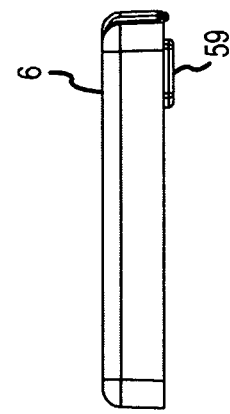
FIG. 29 is a first end view of the top portion of an embodiment of the electrician's caddy invention.
Figure 26:
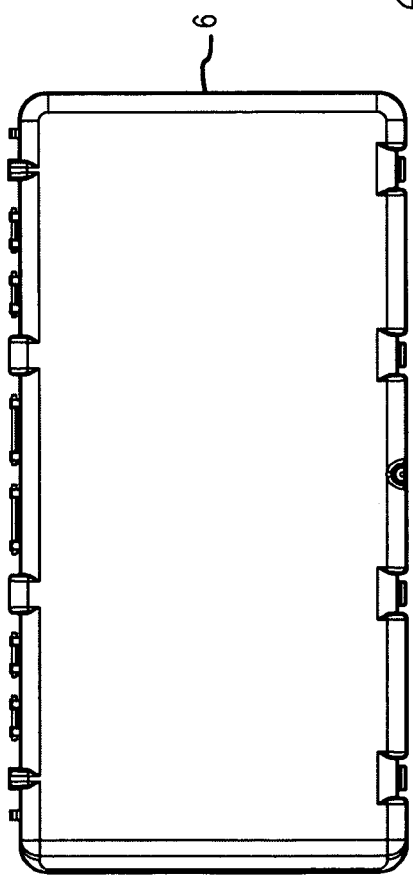
FIG. 26 is a top view of the top portion of an embodiment of the electrician's caddy invention.
Figure 27:
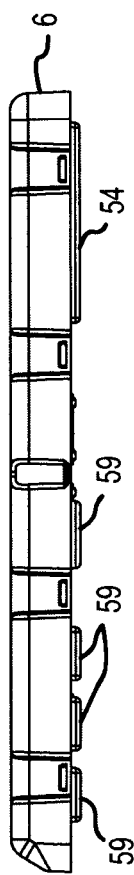
FIG. 27 is a front view of the top portion of an embodiment of the electrician's caddy invention.
Figure 28:
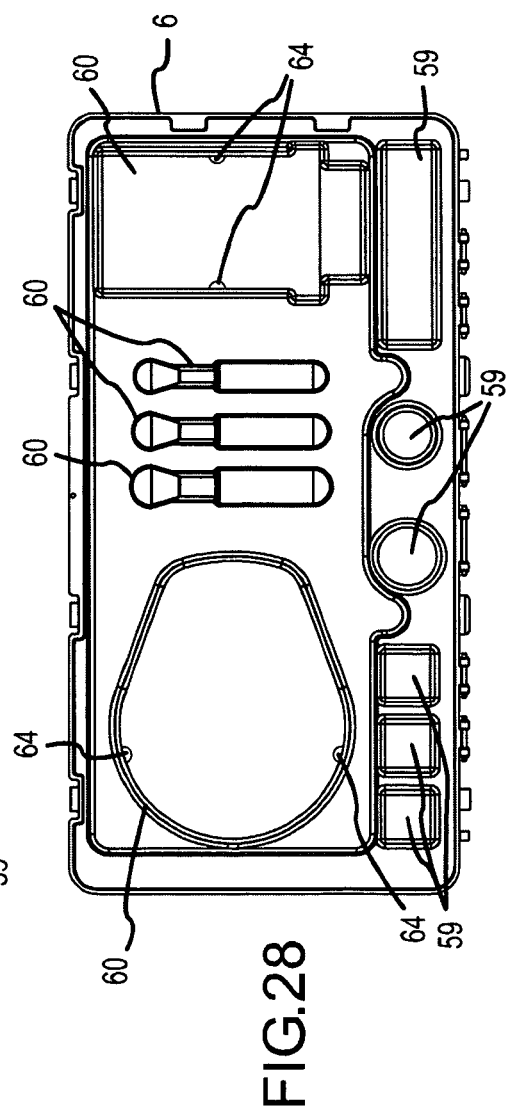
FIG. 28 is a bottom view of the top portion of an embodiment of the electrician's caddy invention showing a plurality of top portion recess elements.
Figure 30:
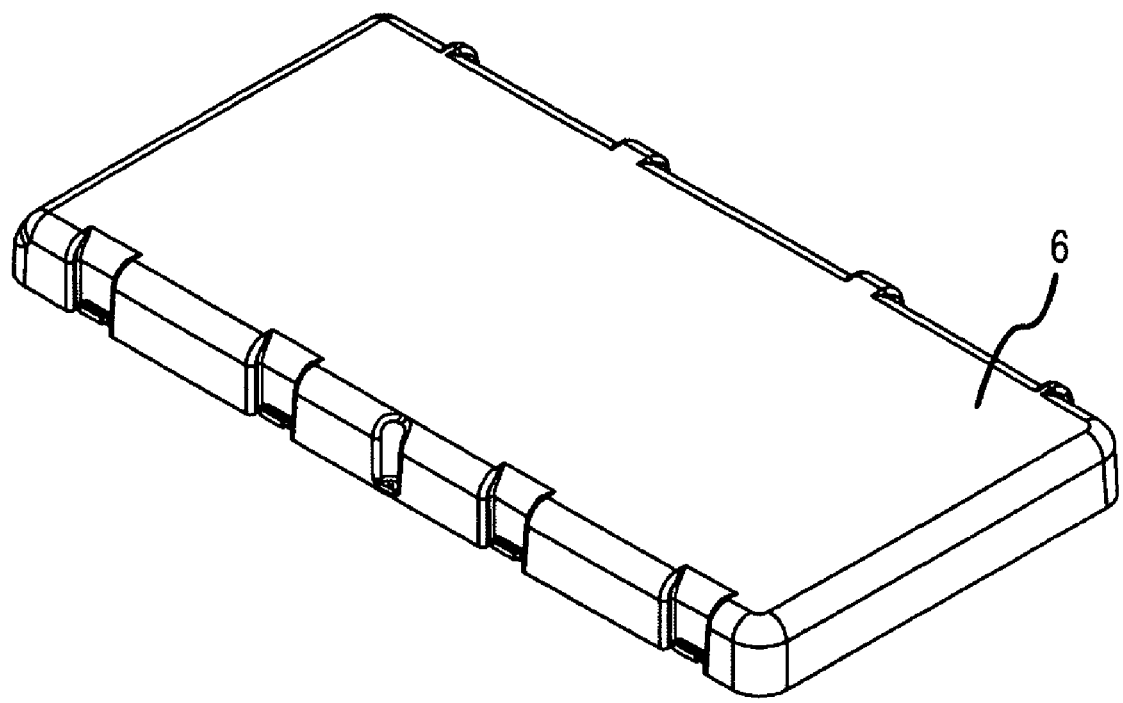
FIG. 30 is front first end perspective view of the top portion of an embodiment of the electrician's caddy invention.

Now referring primarily to FIGS. 23-25, the electrician's caddy (2) invention can further include a wire retainer (50) coupled to the cover (27) which secures a terminal portion (51) of the wire (3)(see also FIG. 9) drawn from the wire spool (28) through the aperture element (29) of the cover (27). Certain embodiments of the wire retainer (50) can be configured (see FIGS. 23 and FIG. 24) as a bore which communicates between opposed surfaces (30)(31) of the cover (27) and the terminal portion (51) of the wire (3) inserts into the bore. As shown by FIG. 25 alternate non-limiting embodiments of the wire retainer (50) can be utilized. As a first example, the wire retainer (50) can include a pair of members (52)(53) which project from the first surface (31) of the cover (27) a distance apart and the terminal portion (51) of the wire (3) can be disposed between the surfaces of the pair of members (52)(53). As a second example, the wire retainer (50) can include a single member coupled to the first surface (31) of the cover (27) and the terminal portion (51) can be wound around the single member to secure the wire (3).

Figure 20:
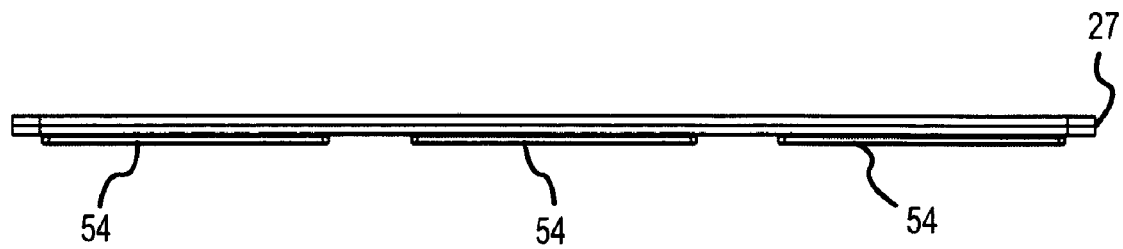
FIG. 20 is a front view of the cover of an embodiment of the electrician's caddy invention.

Now referring primarily to FIGS. 20, 21 and 24, the electrician's caddy (2) invention can further provide at least one cover relief element (54) which insert into a corresponding at least one well (37) upon releasable securement of the cover (27) to the bottom portion (5). As to those embodiments of the invention which provide a plurality of wells (37) a plurality of corresponding cover relief elements (54) can be provided.

Now referring primarily to FIGS. 14-15, 18-19, and 27, the bottom portion (5) of the electrician's caddy (2) can further include one, two, or a plurality of pockets (55) which provide space within for the storage of various hand tools (56), wire pull lubricant (57), wire connectors (58), or the like. The top portion (6) can further include a corresponding top portion relief element (59) which inserts into each pocket (55) of the bottom portion (5) upon securement of the top portion (6) to the bottom portion (5). The top portion relief element(s) (59) can be configured to seal each corresponding pocket (55) to prevent egress of the various items contained in the pockets (55).

Figure 9:
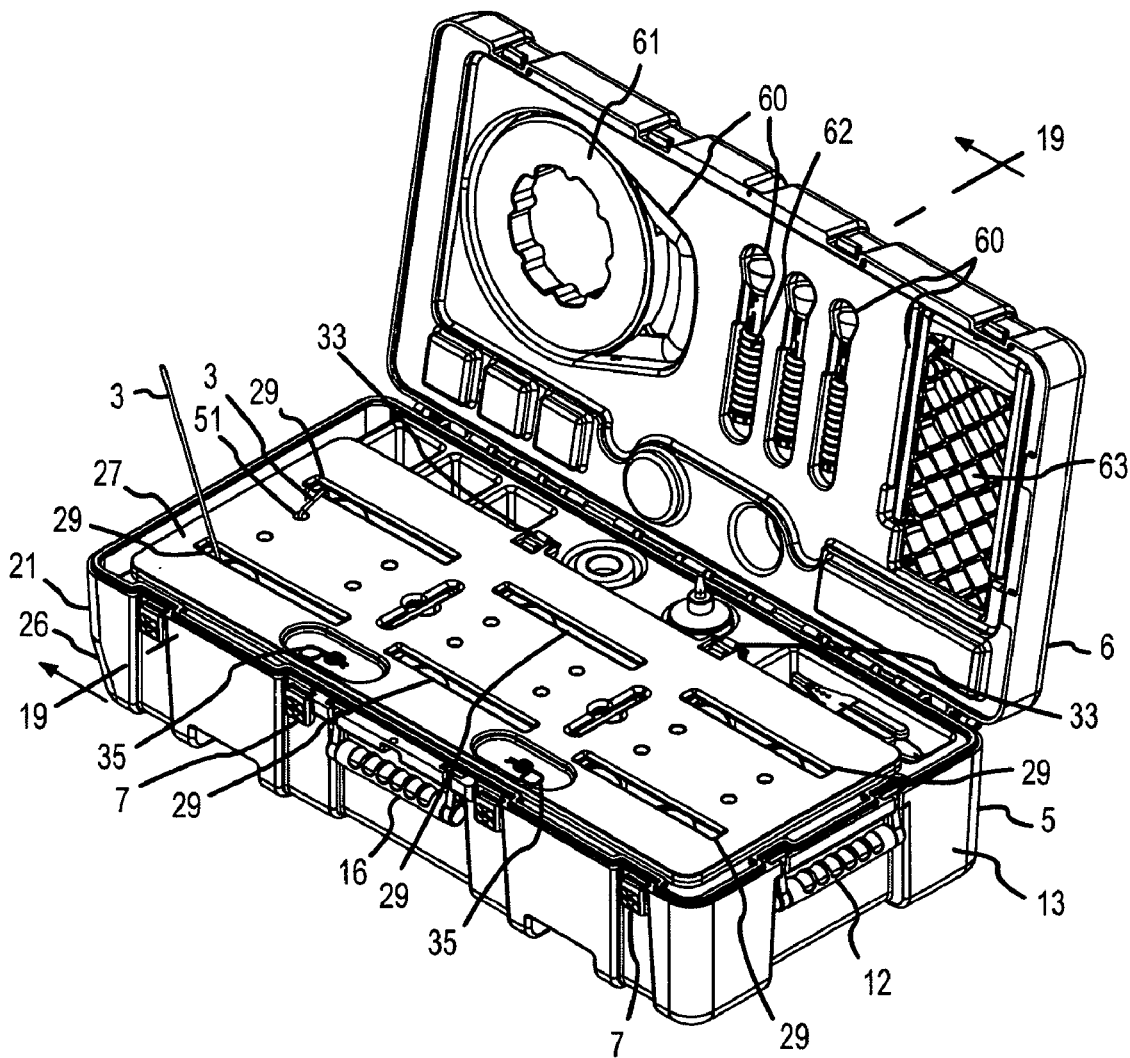
FIG. 9 is a front side first end perspective view of an embodiment of the electrician's caddy invention having the top portion released from securement with the bottom portion.
Figure 13:
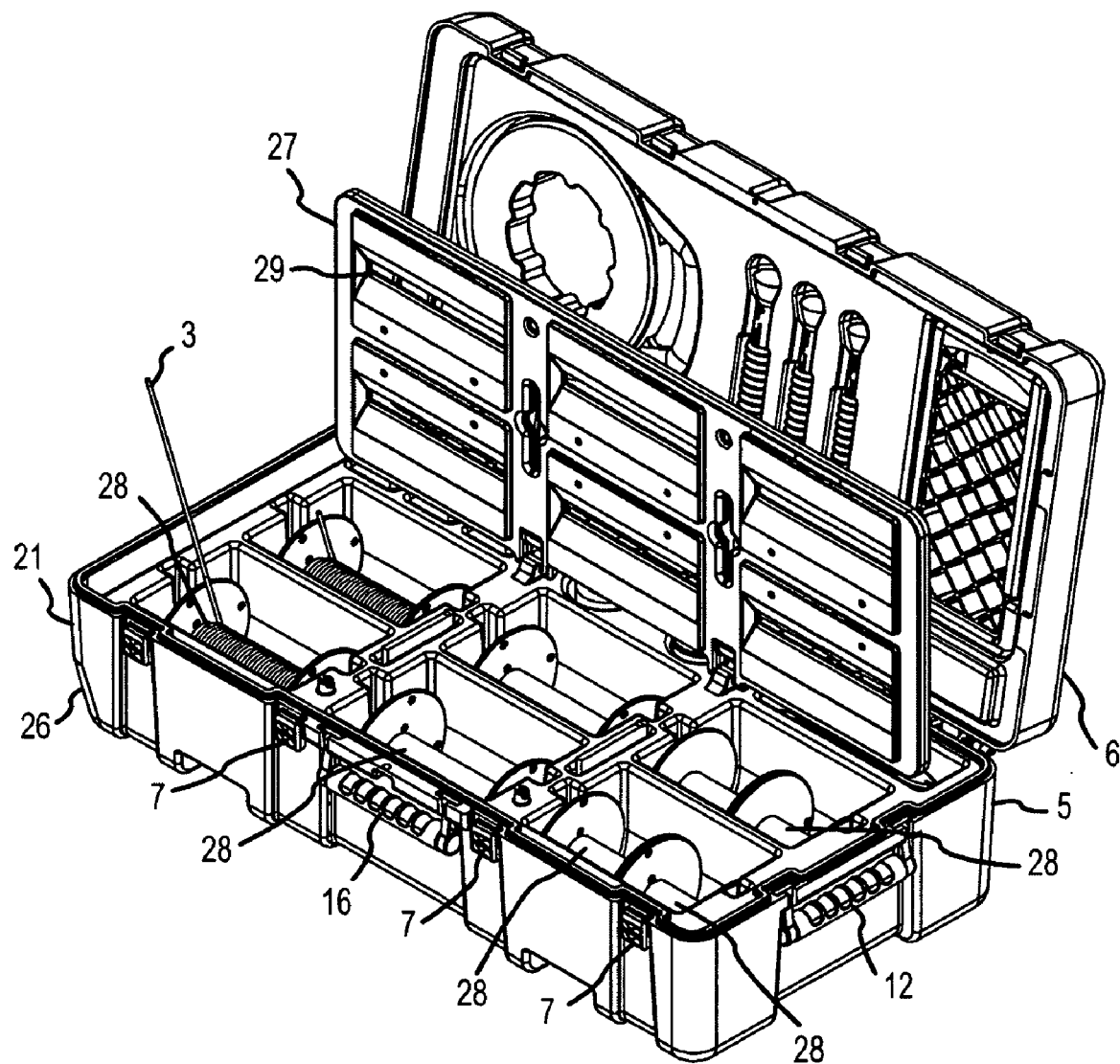
FIG. 13 is front side first end view of an embodiment of the electrician's caddy invention having the top portion and the cover released from securement with the bottom portion.

Now referring primarily to FIGS. 9, 14, 28, 29, and 30 the top portion (6) of the electrician's caddy (2) can further include one, two, or a plurality of top portion recess element(s) (60). Each top portion recess element (60) can be configured to receive a particular item such as a fish tape (61), a wire pull tool (62), or a wire stripper tool (63), as shown by FIG. 9. The top portion recess element(s) (60) can be configured to receive a variety of other items or tools as may be desired. One or more recess element detent(s) (64) can be coupled to each top cover recess element (60) to exert sufficient pressure on the item received by the top portion recess element (60) to retain the item.

Now referring primarily to FIGS. 6, 14 and 18, the electrician's caddy (2) can further include at least one reference book pocket (65) into which a reference book (66) (see FIG. 14) can insert. The cover (27) can further include a corresponding at least one reference book access element (67) (see FIG. 14) which allows retrieval of the reference book (66) from the reference book pocket (65) when the cover (27) is releasably secured to the bottom portion (5).

Now referring primarily to FIGS. 1, 2, 14, and 19, a basic embodiment of the electrician's caddy (2) can be utilized by inserting a wire spool (28) having wire (3) wound upon it into a well (37) located in the bottom portion (5). The wire (3) can be drawn through the corresponding aperture element (29) which communicates between the opposed surfaces (30)(31) of the cover (27). The cover (27) can be releasably secured to the bottom portion (5) to retain the wire spool (28) wound with wire (3) in the well (37) during the period in which the wire (3) is drawn from the wire spool (28). A person (1) can continue to draw wire (3) from the wire spool (28) retained in the well (37) as necessary or desired to establish a length of wire (3) in the conduit (4).

As to alternate embodiments of the electrician's caddy a wire spool axle (38) can be inserted into the wire spool (28) and each end of the wire spool axle (38) can be inserted into a corresponding closed end channel (42). The wire spool axle can travel in the pair of closed end channels (42) to be received by the well (37). In those embodiments of the invention which further include one or a pair of detents (46)(47) in each closed end channel (42), each end of the wire spool axle (38) can be forcibly urged past the detent(s) (46)(47) to be received by the well (37). Various items can be received by one or a plurality of pockets (55) as described above and each pocket can be releasably sealed by releasably securing the top portion (6) of the electrician's caddy (2).

The first end (13) of the bottom portion (5) can be elevated by lifting upwardly on the first handle (12) to engage one or a plurality of wheels (20) with the support surface (22). The electrician's caddy (2) can then be rolled on the support surface (22) to the desired location. The first end (13) of the bottom portion (5) can be lowered to disengage the one or the plurality of wheels from the support surface (22). The top portion (6) can be released from the bottom portion (5) to access the various pockets (55). As to certain embodiments of the invention the terminal portion (51) of the wire (3) can released from the wire retainer (50) and a length of wire (3) can be drawn as above described.

As can be easily understood from the foregoing, the basic concepts of the present invention may be embodied in a variety of ways. The invention involves numerous and varied embodiments of a electrician's caddy and methods of making and using the electrician's caddy.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "cover" should be understood to encompass disclosure of the act of "covering"—whether explicitly discussed or not—and, conversely, were there effectively disclosure of the act of "covering", such a disclosure should be understood to encompass disclosure of a "cover" and even a "means for covering." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the electrician's caddies herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. An electrician's caddy, comprising:
   a. a bottom portion;
   b. at least one well located in said bottom portion having a pair of opposed walls and a well surface configured to receive a wire spool;
   c. an axle having a pair of ends each of which correspondingly engage one of said pair of opposed walls which provides an axis about which said wire spool rotates, and wherein said axis of said axle has a location in said at least one well which maintains a distance between each of a pair of spool ends and said well surface, and wherein said distance maintained between each of said pair of spool ends and said well surface comprises a distance of less than a diameter of said wire wound on said wire spool which maintains said wire between said pair of spool ends;
   d. a cover which releasably secures to said bottom portion, wherein releasable securement of said cover to said bottom portion retains said wire spool in said at least one well; and
   e. an aperture which communicates between opposed surfaces of said cover configured to allow a wire wound on said wire spool to be drawn through said aperture from said at least one well.

2. An electrician's caddy as described in claim 1, wherein said aperture which communicates between said opposed surfaces of said cover has a chamfer.

3. An electrician's caddy as described in claim 2, wherein said chamfer of said aperture which communicates between said opposed surfaces of said cover has an angle of between about twenty degrees and about forty five degrees to said opposed surfaces of said cover.

4. An electrician's caddy as described in claim 3, wherein said chamfer has angle of about 20 degrees to said opposed surfaces of said cover.

5. An electrician's caddy as described in claim 4, wherein said aperture having said chamfer which communicates between said opposed surfaces of said cover further comprises a radius which joins said aperture having said chamfer to a first of said opposed surfaces of said cover.

6. An electrician's caddy as described in claim 5, wherein said aperture comprises a slot.

7. An electrician's caddy as described in claim 1, further comprising a pair of closed end channels coupled to said pair opposed walls of said at least one well, wherein a corresponding end of said axle slidely travels in each of said pair of closed end channels to locate said axle in said at least one well.

8. An electrician's caddy as described in claim 7, further comprising at least one detent disposed in each of said closed end channels which operate to limit travel of said corresponding end of said axle in each of said closed end channel as said wire is drawn from said wire spool.

9. An electrician's caddy as described in claim 8, wherein said at least one detent disposed in each of said closed end channels comprises a pair of opposed detents disposed in each of said closed end channels.

10. An electrician's caddy as described in claim 9, wherein each of said pair of closed end channels coupled to said at least one well further comprise a resiliently flexible wall responsive to said at least one detent.

11. An electrician's caddy as described in claim 10, wherein said resiliently flexible wall of each of said pair of closed end channels allows sufficient travel of said at least one detent to allow said corresponding end of said axle to travel over said at least one detent.

12. An electrician's caddy as described in claim 11, further comprising a wire retainer coupled to said cover, wherein said wire retainer secures a terminal portion of said wire drawn from said wire spool through said aperture in said cover.

13. An electrician's caddy as described in claim 12, wherein said wire retainer coupled to said cover comprises a bore which communicates between said opposed surfaces of said cover.

14. An electrician's caddy as described in claim 13, wherein said terminal portion of said wire inserts in said bore.

15. An electrician's caddy as described in claim 12, wherein said wire retainer comprises a pair of members which project from said cover having opposed surfaces a distance apart.

16. An electrician's caddy as described in claim 15, wherein said terminal portion of said wire is disposed between said opposed surfaces of said pair of members which project from said cover.

17. An electrician's caddy as described in claim 12, wherein said wire retainer comprises a single member which projects from said cover.

18. An electrician's caddy as described in claim 17, wherein said terminal portion of said wire winds about said single member which projects from said cover.

19. An electrician's caddy as described in claim 11, wherein said at least one well in said bottom portion comprises a plurality of wells in said bottom portion.

20. An electrician's caddy as described in claim 19, wherein said at least one well has a configuration to receive a pair of wire spools.

21. An electrician's caddy as described in claim 20, wherein said cover releasably secures to retain each of a plurality of wire spools in each of said plurality of wells.

22. An electrician's caddy as described in claim 21, wherein said cover further comprises a plurality of cover relief elements, and wherein each of said plurality of cover relief elements insert into a corresponding one of said plurality of wells upon releasable securement of said cover to said bottom portion.

23. An electrician's caddy as described in claim 22, further comprising an axis about which said cover rotates.

24. An electrician's caddy as described in claim 23, further comprising at least one pocket located in said bottom portion.

25. An electrician's caddy as described in claim 24, wherein said at least one pocket located in said bottom portion comprises a plurality of pockets.

26. An electrician's caddy as described in claim 25, further comprising a top portion which releasably secures to said bottom portion, wherein said top portion further comprises at least one top portion relief element which inserts in said at least one pocket located in said bottom portion upon releasable securement of said top portion to said bottom portion.

27. An electrician's caddy as described in claim 26, further comprising a top portion which releasably secures to said bottom portion, wherein said top portion further comprises a plurality of top portion relief elements each of which insert in a corresponding one of said plurality of pockets located in said bottom portion upon releasable securement of said top portion to said bottom portion.

28. An electrician's caddy as described in claim 27, further comprising at least one recessed element in said top portion configured to receive at least one tool.

29. An electrician's caddy as described in claim 28, further comprising a plurality of recessed elements in said top portion each configured to receive one each of a plurality of tools.

30. An electrician's caddy as described in claim 29, further comprising at least one detent coupled to said at least one recessed element in said top portion which exerts sufficient pressure on said at least one tool to retain said tool in said at least one recessed element.

31. An electrician's caddy as described in claim 30, further comprising an axis about which said top portion rotates to releasably secure with said bottom portion.

32. An electrician's caddy as described in claim 31, further comprising a plurality of wheels rotatably coupled to said bottom portion.

33. An electrician's caddy as described in claim 32, wherein said top portion releasably secures to said bottom portion with a plurality of fasteners.

34. An electrician's caddy as described in claim 33, further comprising a first handle coupled to an end wall of said bottom portion, and a second handle coupled to a side wall of said bottom portion.

35. An electrician's caddy as described in claim 34, further comprising a storage pocket located in said bottom portion having a projecting relief element which engages said top portion in the releasably secured condition.

36. An electrician's caddy as described in claim 35, further comprising at least one reference book pocket located in said bottom portion accessible through a reference book slot in said cover in the releasably secured condition.

37. An electrician's caddy as described in claim 36, further comprising a pair of reference book pockets located in said bottom portion each accessible through a corresponding each of a pair of reference book slots in said cover in the releasably secured condition.

* * * * *